(12) United States Patent
Dodsworth

(10) Patent No.: US 8,656,289 B1
(45) Date of Patent: *Feb. 18, 2014

(54) SYSTEM AND METHOD FOR MANAGING AND DISPLAYING DATA MESSAGES

(75) Inventor: Iain Gregory Dodsworth, Crowborough (GB)

(73) Assignee: Tweetdeck, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,758

(22) Filed: Jun. 18, 2012

Related U.S. Application Data

(63) Continuation of application No. 12/497,603, filed on Jul. 3, 2009, now Pat. No. 8,230,350.

(51) Int. Cl.
*G06F 15/00* (2006.01)
*G06F 13/00* (2006.01)

(52) U.S. Cl.
USPC .......................................... 715/751; 715/805

(58) Field of Classification Search
USPC ......... 715/751, 805, 763–765, 851–853, 809, 715/753, 792–793
See application file for complete search history.

(56) References Cited

U.S. PATENT DOCUMENTS

| | | | |
|---|---|---|---|
| 6,023,730 A | 2/2000 | Tani | |
| 2004/0260829 A1 | 12/2004 | Husak et al. | |
| 2005/0114781 A1* | 5/2005 | Brownholtz et al. | 715/733 |
| 2005/0132053 A1 | 6/2005 | Roth et al. | |
| 2008/0059954 A1* | 3/2008 | Martin | 717/134 |
| 2008/0120370 A1 | 5/2008 | Chan et al. | |

* cited by examiner

*Primary Examiner* — Cao Kevin Nguyen

(57) ABSTRACT

A system and method for managing and displaying data messages includes a computing device configured to receive stream data, assign data messages of the stream data to one or more display columns of a graphical user interface, and display the data messages in the assigned columns. The stream data may be embodied as short data messages such as text messages having predetermined maximum character length. The data messages may be assigned to the display columns based on meta-data associated with the data messages such as the author of the data message, the source of the data message, and/or the type of the data message.

20 Claims, 9 Drawing Sheets

SYSTEM AND METHOD FOR MANAGING AND DISPLAYING DATA MESSAGES

CROSS-REFERENCE TO RELATED APPLICATIONS

This application is a continuation of U.S. patent application Ser. No. 12/497,603, entitled: "SYSTEM AND METHOD FOR MANAGING AND DISPLAYING DATA MESSAGES" and filed on Jul. 3, 2009. Accordingly, this application claims benefit from U.S. patent application Ser. No. 12/497,603 under 35 U.S.C. §120.

TECHNICAL FIELD

The present disclosure relates generally to managing and displaying data messages and, more particularly to, managing and displaying continually updating, short data messages.

BACKGROUND

Some social networking services, blogging (e.g., microblogging) services, and other communication services interconnect users via use of data messages such as text messages. In some systems, the size or length of the data messages is limited to a predetermined maximum (e.g., 160 characters long). The short length of the data messages facilitates the transferring of many short data messages at a continual rate.

Users of the communication services use client software on a desktop or mobile computer to receive, display, generate, and transmit the data messages. Given the rapidity and size of the incoming data messages, the typical client software displays the received data messages in a single, vertical stack, which requires the user to visually peruse through the multiple displayed messages to locate particular messages of interest, those having commonality, and/or the like.

SUMMARY

According to one aspect, a computing device may include a display, a processor communicatively coupled to the display, and a memory device communicatively coupled to the processor. The memory device may have stored therein a plurality of instructions, which when executed by the processor, cause the processor to display a graphical user interface on the display. The graphical user interface may include a plurality of columns configured for displaying data messages therein. The plurality of instructions may also cause the processor to receive stream data from a network. The stream data may include a plurality of data messages. The plurality of instructions may additionally cause the processor to determine identification data associated with each of the data messages and assign each of the plurality of data messages to a column of the plurality of columns based on the identification data. Further, The plurality of instructions may cause the processor to display each of the plurality of data messages in its assigned column.

In some embodiments, the plurality of data messages may include a plurality of short text messages. The short text messages may have a maximum character length no greater than about 256 characters in some embodiments. In other embodiments, the short text messages may have a maximum character length no greater than about 160 characters. Additionally, in some embodiments the identification data associated with each of the data messages may include data indicative of a communication service provider from which data messages originated. For example, the data indicative of a communication service may include a uniform resource locator (URL) of the communication service provider. In some embodiments, the identification data associated with each of the data messages may include data that uniquely identifies the author of the data message. Further, in some embodiments, the identification data associated with each of the data messages may include data indicative of a type of data message.

In some embodiments, the plurality of columns configured for displaying messages therein may include a first column and a second column. The first column may be positioned to the left of the second column. In such embodiments, the plurality of instructions may cause the processor to move the second column with respect to the first column. In some embodiments, the plurality of instructions may further cause the processor to assign a name to each of the plurality of columns and display the assigned name in association with the respective column. Additionally, in some embodiments, the plurality of instructions further cause the processor to request entry of filter data and filter data messages displayed in a column of the plurality of columns based on the filter data. Further, in some embodiments, each of the data messages of the stream data may include an associated time stamp. In such embodiments, the plurality of instructions may cause the processor to display each of the data messages in its assigned column in a vertical order based on the time stamp of each data message.

According to another aspect, a machine-readable, tangible medium may include a plurality of instructions, which in response to being executed, may result in a computing device receiving stream data from a network. The stream data may include a plurality of short text messages. Each of the short text messages may have a maximum, predetermined character length of about 160 characters. The plurality of instructions may also result in the computing device assigning each short text message to at least one display column of a graphical user interface based on identification data associated with the short text message. Additionally, the plurality of instructions may result in the computing device displaying each short text message in the display column assigned to the short text message.

In some embodiments, the plurality of instructions may result in the computing device assigning each short text message to the at least one display column of the graphical user interface based on identification data including a uniform resource locator (URL) of the communication service provider from which the short text message originated. Additionally, in some embodiments, the plurality of instructions may result in the computing device assigning each short text message to the at least one display column of the graphical user interface based on identification data including data that uniquely identifies the author of the short text message. Further, the plurality of instructions may result in the computing device assigning each short text message to the at least one display column of the graphical user interface based on identification data including data indicative of a type of short text message. The plurality of instructions may also result in the computing device requesting entry of filter data and filtering short text messages displayed in the at least one display column of a graphical user interface based on the filter data. Additionally, in some embodiments, the plurality of instructions may result in the computing device displaying each short text message in the display column assigned to the short text message in an order based on a time stamp associated with the short text message.

According to a further aspect, a method for displaying short data messages may include displaying a graphical user interface on a display of a computing device. The graphical user interface may include a plurality of columns configured for displaying data messages therein. The method may also include receiving stream data with the communication circuitry of the computing device over a network, the stream data including a plurality of data messages. Additionally, the method may include electronically filtering the stream data based on meta-data associated with each of the plurality of data messages. The method may further include displaying each of the plurality of data messages in at least one of the plurality of columns based on the electronically filtering step.

In some embodiments, electronically filtering the stream data based on meta-data associated with each of the plurality of data messages may include determining data indicative of a communication service provider from which data messages originated. Additionally, in some embodiments, displaying each of the plurality of data messages may include displaying each of the plurality of data messages in the at least one of the plurality of columns based on the data indicative of a communication service provider from which data messages originated. Further, in some embodiments, electronically filtering the stream data based on meta-data associated with each of the plurality of data messages may include determining data that uniquely identifies the author of each of the data messages. In such embodiments, displaying each of the plurality of data messages may include displaying each of the plurality of data messages in the at least one of the plurality of columns based on the data that uniquely identifies the author of each of the data messages.

BRIEF DESCRIPTION OF THE DRAWINGS

The detailed description particularly refers to the following figures, in which.

DETAILED DESCRIPTION

Figure 1:
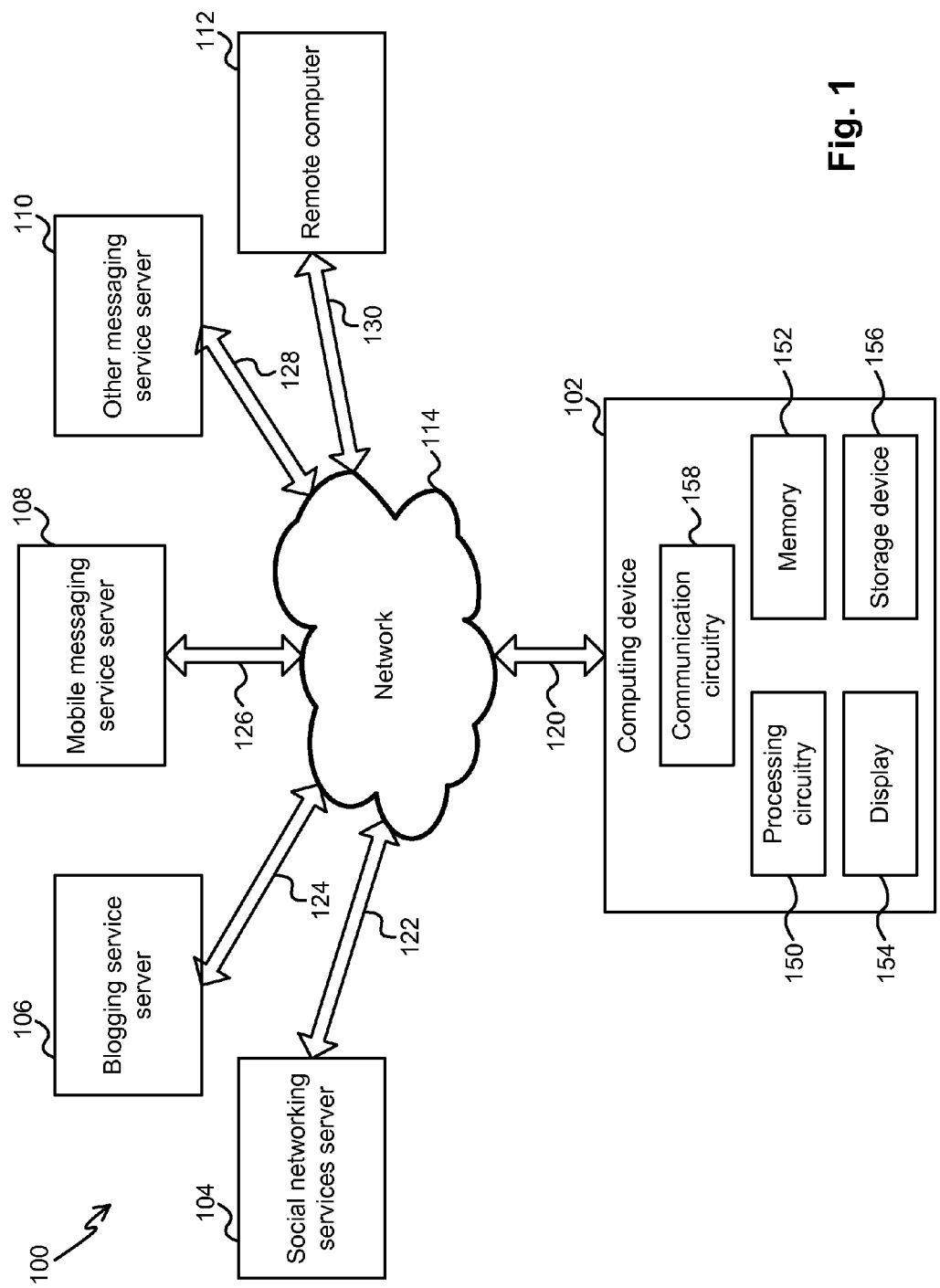
FIG. 1 is a block diagram of one embodiment of a system for managing and displaying data messages.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, low-level hardware architecture and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on a machine-readable, tangible medium, which may be read and executed by one or more processors. A machine-readable, tangible medium may include any physical mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, a system 100 for managing and displaying data messages includes a computing device 102 and at least one of a social networking services server 104, a blogging service server 106, a mobile messaging service server 108, other messaging service server 110, and/or one or more other remote computers 112. The computing device 102 is configured to communicate with the servers 104, 106, 108, 110, and/or the computer(s) 112 over a network 114. The network 114 may be embodied as or otherwise include any type of network(s) capable of facilitating communication between the computing device 102 and the servers 104, 106, 108, 110, and/or the computer(s) 112. For example, the network 114 may be embodied as or otherwise include a wired network, a wireless network, a local area network (LAN), and/or a wide area network (WAN). In one particular embodiment, the network 114 is embodied as or otherwise includes a publically-accessible global network such as the Internet.

The computing device 102 is communicatively coupled to the network 114 via a number of communication links 120. Similarly, the social networking services server 104 is communicatively coupled to the network 114 via a number of communication links 122, the blogging service server 106 is communicatively coupled to the network 114 via a number of communication links 124, the mobile messaging service server 108 is communicatively coupled to the network 114 via a number of communication links 126, the other messaging service server 110 is communicatively coupled to the network 114 via a number of communication links 128, and the remote computer(s) 112 is communicatively coupled to the network 114 via a number of communication links 130. Each of the communication links 120, 122, 124, 126, 128, 130 may be embodied as any type of communication links capable of facilitating communication between the respective computing device 102, social networking services server 104, blogging service server 106, mobile messaging service server 108, other messaging service server 110, and remote computer(s) 112. For example, any one or more of the communication links 120, 122, 124, 126, 128, 130 may be embodied as any number of wires, cables, printed circuit board traces, vias, and/or other communication links. Additionally, any one or more of the communication links 120, 122, 124, 126, 128, 130 and/or the network 114 may include any number of interconnected communication devices such as routers, switches, modems, and the like to facilitate communication therebetween.

The computing device 102 may be embodied as any type of computing device configured to perform the functions described herein including, but not limited to, a personal desktop computer, a mobile computer, a personal digital assistant (PDA), and/or the like. The computing device 102 illustratively includes a processor 150, a memory device 152, a display 154, a storage device 156, and communication circuitry 158.

The processing circuitry 150 may be embodied as any type of processing circuitry including, for example, discrete processing circuitry (e.g., a collection of logic devices), general purpose integrated circuit(s), and/or application specific integrated circuit(s) (i.e., ASICs). Although the computing device 102 includes only a single processor or processing circuitry 150 in the embodiment illustrated in FIG. 1, the computing device 102 may include any number of processors (or processor cores) in other embodiments.

The memory device 152 may be embodied as any type of memory device such as read-only memory (ROM) devices and random access memory devices including, but not limited dynamic random access memory devices (DRAM), synchronous dynamic random access memory devices (SDRAM), double-data rate dynamic random access memory device (DDR SDRAM), and/or other volatile memory devices. Additionally, although only a single memory device 152 is illustrated in FIG. 1, in other embodiments, the computing device 102 may include any number of memory devices.

The display 154 may be embodied as any type of display device for displaying text and images to a user of the computing device 102 such as, for example, a liquid crystal display (LCD) device, a cathode-ray tube (CRT) device, a plasma display device, or other display device. In some embodiments, the display 154 may form an integral portion of the computing device 102 (e.g., in those embodiments in which the computing device 102 is embodied as a mobile computer). In other embodiments, the display 154 may be embodied as a separate display device that is communicatively coupled to the other devices (e.g., the processing circuitry 150) of the computing device 102.

The storage devices 156 may be embodied as any number of devices configured for data storage. That is, the storage device 156 may be embodied as any number of discrete devices such as hard drive or collection of hard devices and/or virtual devices such as any number of databases or set of memory locations. Additionally, in some embodiments, the storage device 156 is separate from the computing device 102, but communicatively coupled thereto.

The communication circuitry 158 of the computing device 102 may be embodied as any type of communication circuitry capable of facilitating communication between the computing device 102 and at least one of the servers 104, 106, 108, 110 and/or the remote computer(s) 112 over the network 114. The communication circuitry 158 may be embodied as or otherwise include, for example, network interface cards, modems, routers, switches, and/or other communication circuitry and/or devices. In addition, the computing device 102 may include other devices and circuitry typically found in a computer for performing the functions described herein including, but not limited to, input devices such as a keyboard and/or mouse, output devices such as a monitor and/or printer, and/or the like.

Each of the social networking services server 104, blogging service server 106, mobile messaging service server 108, and other messaging service server 110 may be embodied as any type of computer or collection of computers or computing devices configured to perform the functions and services provided by each messaging service provider. For example, each server 104, 106, 108, 110 is configured to transmit data messages to and receive data messages from the computing device 102 as discussed in more detail below. The particular type, size, and periodicity of the data messages and the communication protocols used may differ between the servers 104, 106, 108, 110 based on the type of messaging service provided. For example, the social networking service provider may be embodied as a communication service provider configured to deliver and receive many data messages in relatively high volume (e.g., Twitter®). The blogging service provider may be embodied as a communication service provider configured to deliver and receive data messages, updates, or other messages in a relatively lower volume (e.g., Facebook®). The mobile messaging service provider may be embodied as a communication service provider configured to deliver and receive data messages from a mobile computing device such as a portable digital assistant (PDA). Similarly, the other messaging service provider may be embodied as any communication service provider configured to transmit or receive data messages to the computing device 102.

Similarly, the remote computer 112 may be embodied as any type of computer or collection of computers or computing devices configured to transmit data messages to the computing device 102 over the network 114. For example, the remote computer 112 may be embodied as a personal desktop computer, a mobile computer, or a collection of computers or computing devices. The remote computer 112 may use any one of a number of communication software and/or protocols to communicate the data messages to and receive data messages from the computing device 102.

In use, the computing device 102 is usable by an end-user to receive and transmit data messages from any one or more of the social networking services server 104, blogging service server 106, mobile messaging service server 108, other messaging service server 110, and remote computer(s) 112. In particular, the computing device 102 is configured to receive stream data from any one or more of the servers 104, 106, 108, 110 and/or computer 112 over a relatively short time period. The stream data is embodied as a plurality of data messages continually received over a short time period (e.g., multiple data messages received every minute). As such, the stream data may embody a large number of data messages.

Figure 2:
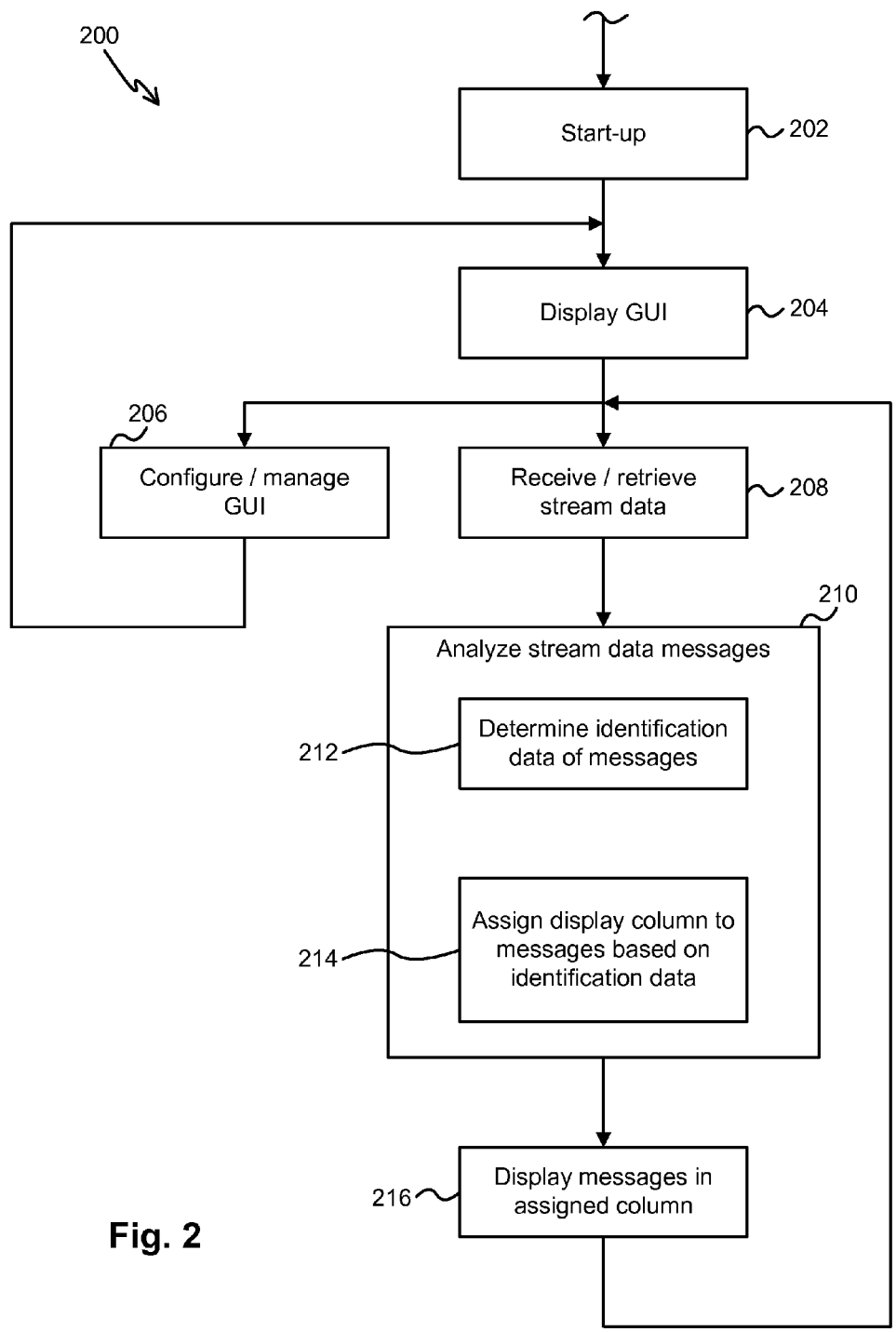
FIG. 2 is a simplified flowchart of a software process for managing and displaying data messages.

In some embodiments, the data messages of the stream data may be embodied as text messages having a predetermined maximum character length. For example, in one embodiment, the data messages have a maximum character length of 256 characters or less. In another embodiment, the data messages have a maximum character length of 160 characters or less. Additionally, in other embodiments, the data messages may have maximum character lengths of other values. The predetermined maximum character length may be determined by the communication service providers, by the communication technology protocol used, or by some other parameter. For example, in some embodiments, the data messages may be embodied as short message service (SMS) messages having a maximum 7-bit character length of about 160 characters. Additionally, in some embodiments, the data messages may include or otherwise be embodied as a picture(s), an image(s), a sound(s), or other non-text data As discussed in more detail below, the computing device 102 is configured to receive the stream data (i.e., the plurality of data messages) from one or more of the servers 104, 106, 108, 110 and/or remote computer(s) 112 and display the stream data to the end-user in a columnar format. To do so, the computing device 102 may execute a software process or method 200 as illustrated in FIG. 2. The method 200 begins with block 202 in which start-up procedures are performed.

For example, data registers and other memory locations may be initialized in block 202. Additionally, other boot-up processes and maintenance processes may be executed or otherwise performed by the computing device 102 in block 202.

Figure 3:
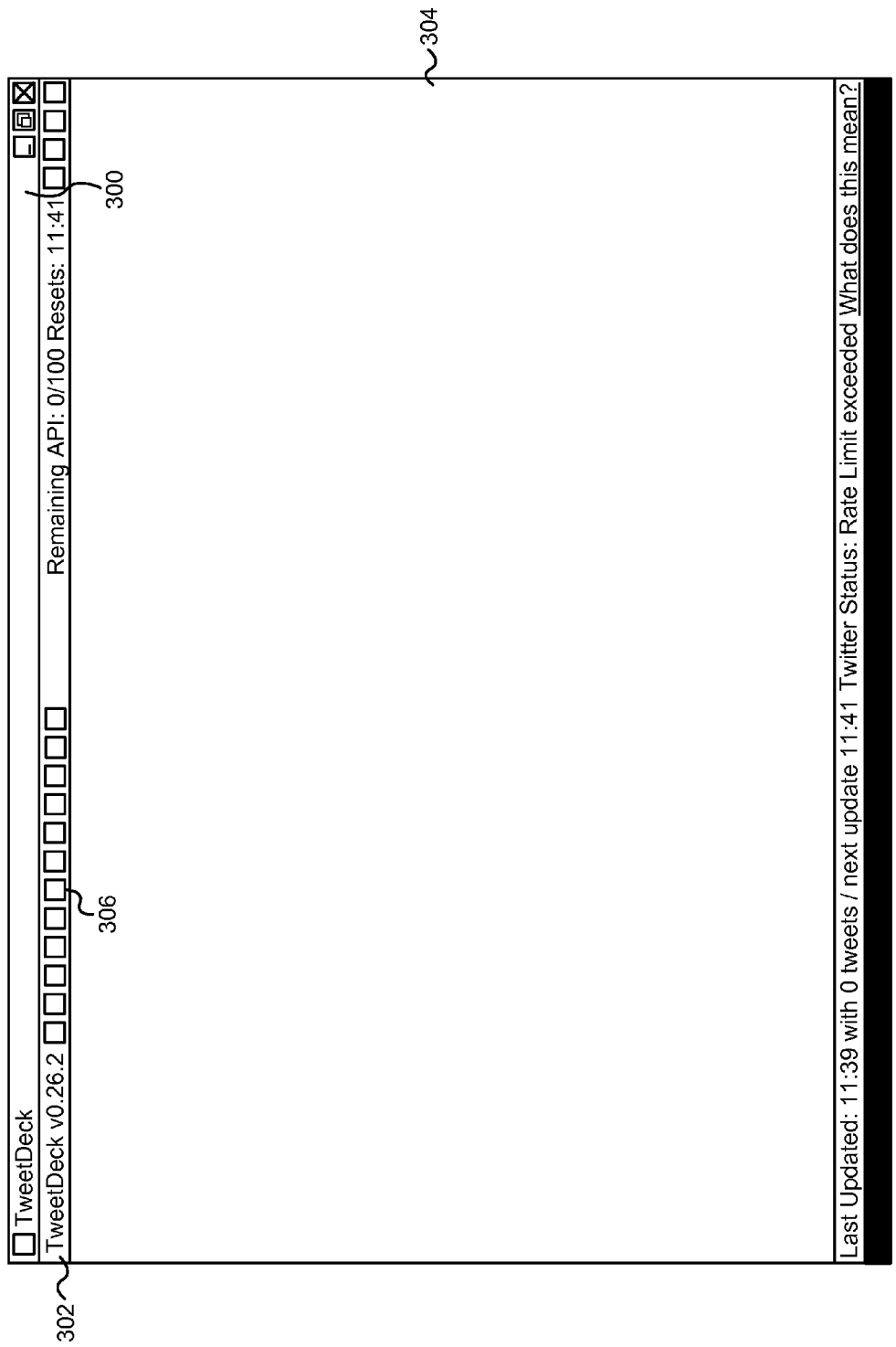
FIGS. 3-9 are illustrative screenshots displayed on the user's computing device during execution of the software process illustrated in FIG. 2.
Figure 4:
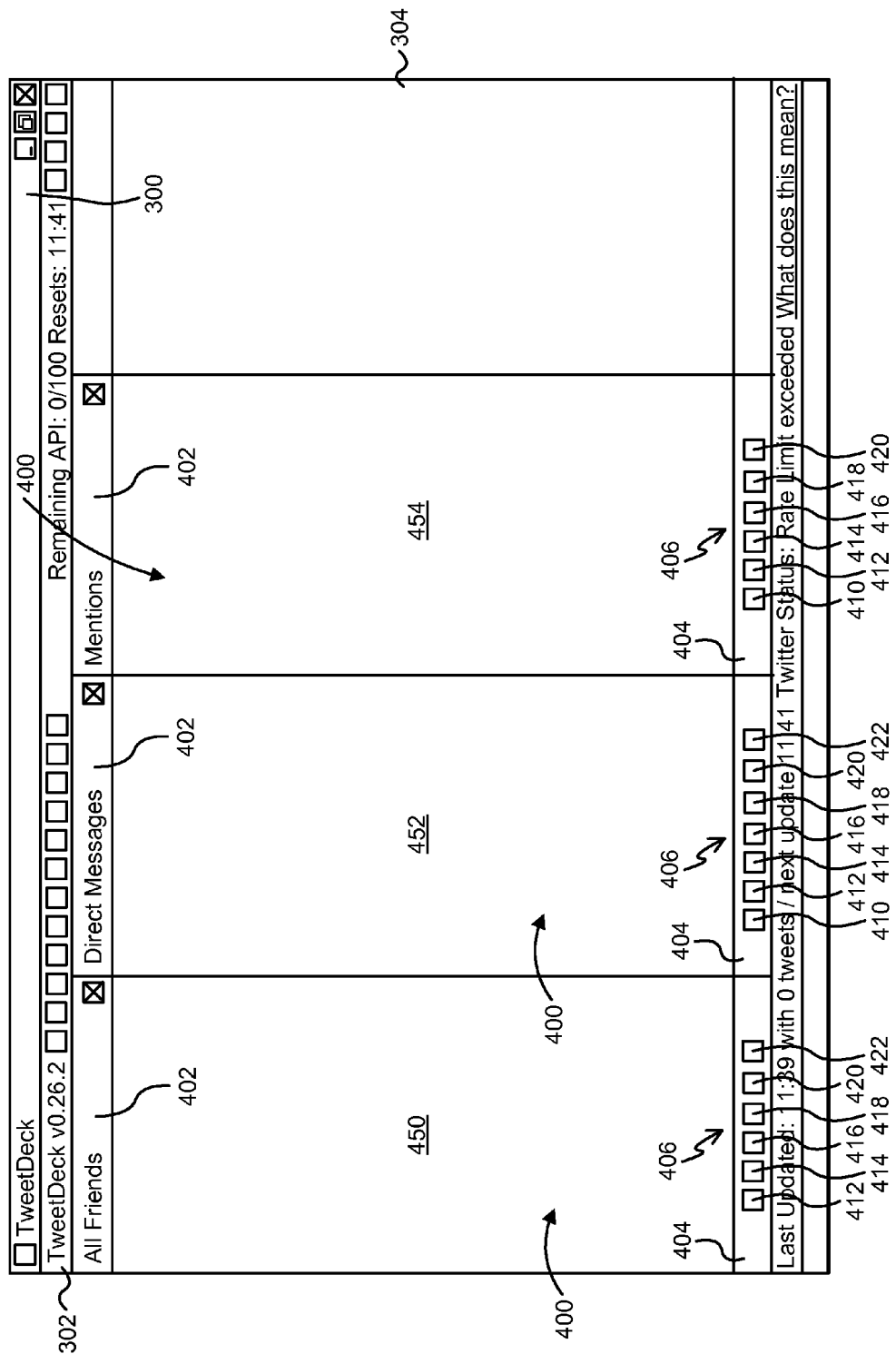

In block 204, the computing device 102 displays a graphical user interface (GUI) to the user on the display 154. The graphical user interface is configured to display data messages to the user in a columnar format. One illustrative graphical user interface 300 is illustrated in FIG. 3. The graphical user interface 300 includes a toolbar 302 and a data message display area 304 in which data message columns are displayed. For example, as shown in FIG. 4, the data message display area 304 may include one or more data message columns 400, each configured to display data messages in a separate vertical configuration as discussed in more detail below. Each data message column 400 includes a header bar 402 in which the name of the display column and/or other information associated with the particular display column is displayed. Each data message column 400 also includes a tool bar 404 including a plurality of tool buttons 406 for managing the display columns 400. Illustratively, the header bar 402 is located at the top of the column 400 and the tool bar 404 is located at the bottom of the column 400. However, in other embodiments, the bars 402, 404 may be located in other locations within each particular column 400.

In the illustrative embodiment of FIG. 4, the tool buttons 406 of the tool bar 404 include a move-column button 410, a show popular button 412, a filter-column button 414, a mark-all-seen button 416, a clear-seen button 418, a clear-all button 420 and a move-column button 422. As discussed in more detail below, the move-column buttons 410, 422 may be selected to change the location of the particular column within the data message display area 304. That is, the move-column button 410 may be selected to move the particular column 400 to the left of the next left-adjacent display column 400 and the move-column button 420 may be selected to move the particular column 400 to the right of the next right-adjacent display column 400. The show-popular button 412 may be selected to display information indicative of the most popular words, phrases, or other text included in the data messages currently displayed in the particular display column 400. The filter-column button 414 may be selected to filter the data messages currently displayed in the particular display column 400 based on filter data supplied by the user. The mark-all-seen button 416 may be selected to mark each of the data messages currently displayed in the particular display column 400 as "seen" or otherwise read by the user. The clear-seen button 416 may be selected to clear, delete, or otherwise remove all data messages currently displayed in the particular display column 400 that have been marked as "seen." Additionally, the clear-all button 418 may be used to clear, delete, or otherwise remove all data messages currently displayed in the particular display column 400.

Figure 5:
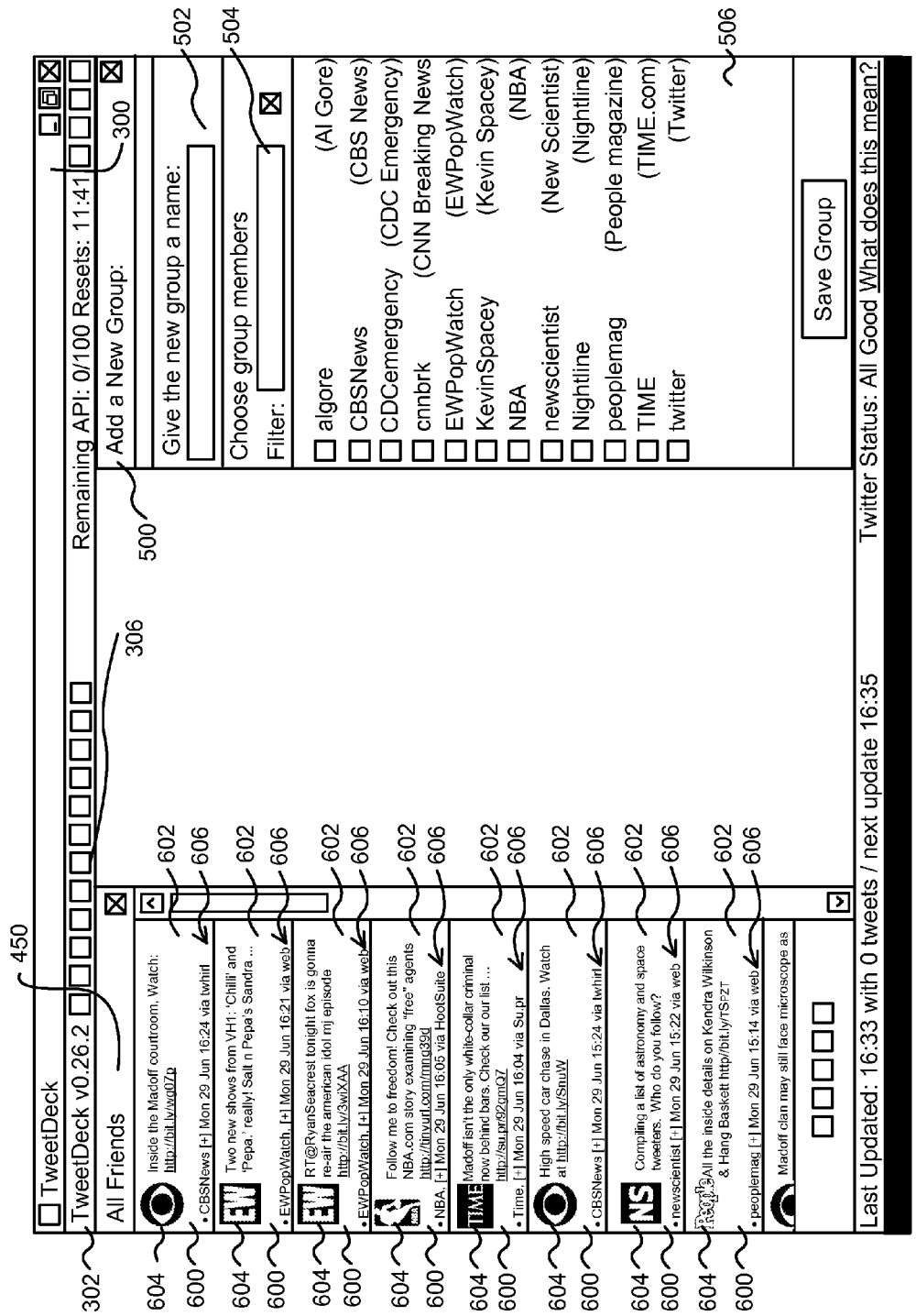

Each of the display columns 400 displayed in the data message display area 304 may be configured to display particular types data messages. For example, as discussed in more detail below, data messages may be displayed in particular columns based on the meta-data or identification data associated with each particular data message. For example, as illustratively shown in FIG. 4, the display columns 400 may include an "All Friends" display column 450 in which each all data messages received from a predefined source, author, or that otherwise meet predetermined criteria (e.g., authored by an individual or entity previously identified as a "friend" or identified as being "followed" by the user). As shown in FIG. 5, the "All Friends" display column 450 may include a large number of data messages 600 from many different sources. Illustratively, each data message 600 includes a text window 602 and an icon 604, which is displayed in the top-left most corner of the text window 602. The text of the data message 600 is displayed in the text window 602. Additionally, identification data 606 associated with the particular data message 600 is displayed at the bottom of the text window. The identification data 606 may include data indicative of the name, screen name, or other unique identity of the author of the data message 600, the time and date of the data message, and the communication service provider and/or software package used to generate the data message. However, in other embodiments, the data message 600 may have other configurations and/or include other types of data.

Referring back to FIG. 4, the display columns 400 may also include a "Direct Messages" display column 452 in which data messages directed specifically to the user are displayed. Additionally, the display columns 400 may include a "Mentions" display column 454 in which received data messages including user's name, screen name, or other identification data, are displayed. As discussed in more detail below, in addition to the predefined display columns 450, 452, 454, the user may create additional display columns 400 configured to display data messages based on the meta-data and/or identification data associated with each data message.

Referring back to FIG. 2, after the graphical user interface is displayed to the user in block 204, the user may optionally configure and/or manage the graphical user interface in block 206. To do so, the user may perform any one of a number of different configuration and/or managing procedures on the graphical user interface to thereby setup or change the interface. For example, the user may create, delete, or move display columns 400. Additionally, the user may rename display columns 400, apply filtering to one or more display columns, and/or perform additional configuration and/or managing procedures. For example, as illustrated in FIG. 5, the user may create a new display column 400 by selecting a "Group" button 306 from the tool bar 302 of the graphical user interface 300. In response, an Add New Group window 500 is displayed in the data message display area 304. The Add New Group window 500 includes a name data window 502 in which the user can enter a name for the new display column, a filter data window 504 in which the user can enter data on which to filter data messages to be displayed in the new display column, and an All Friends window 506 in which social groups, individuals, companies, or other entities that the user has previously identified as "friends" or as being "followed" by the user are displayed.

To create the new display column, the user may enter a name for the new display column in the name data window 502 and enter data in the filter data window 504 and/or select one or more predefined "friends" from the list displayed in the All Friends window 506. If the user enters filter data in the filter data window 504, any received data message including the entered filter data or otherwise matching the filter data will be displayed in the newly created display column. For example, the user may enter subject matter data in the filter data window 504 to cause all data messages including the subject matter text to be displayed in the newly created window. Alternatively, the user may enter identification data, such as the author, the communication service provider, or the type of data, in the filter data window 504 to cause all data messages including the filter data in its associated meta-data to be displayed in the newly created window as discussed in more detail below. Additionally or alternatively, the user may select one or more of the predefined "friends" from the list displayed in the All Friends window 506 to cause all data messages sent to or from the predefined "friend" (e.g., friend group) to be displayed in the newly created display window.

Figure 6:
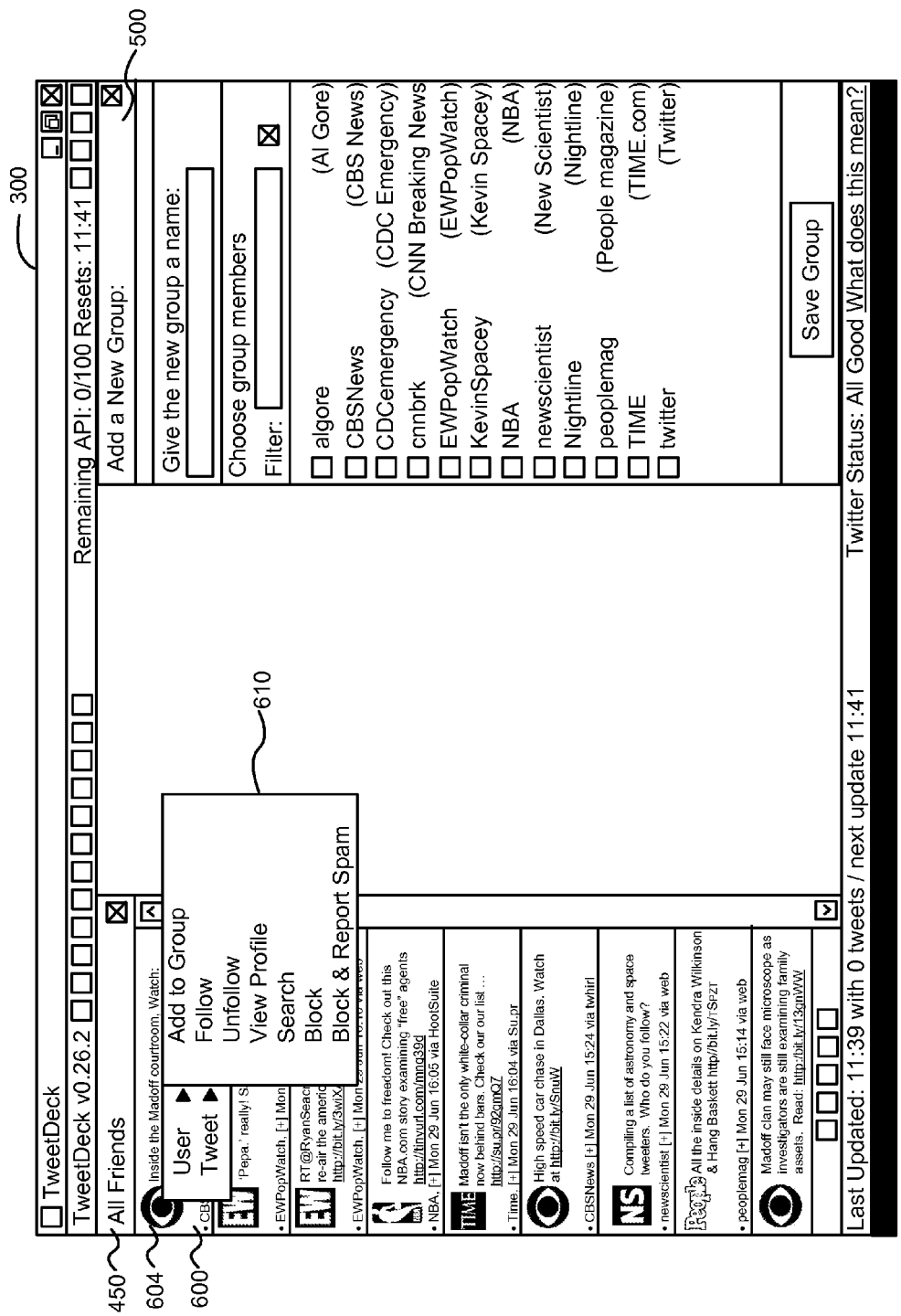

Additionally, the user may select any of the data messages currently displayed in the "All Friends" display column 450 to add data messages from that particular "friend" (e.g., friend group) to be displayed in any other existing display column. To do so, as illustrated in FIG. 6, the user may click on (e.g., right-click) the icon 604 of any of the data messages 600 displayed in the display column 450. In response, a tool window 610 is displayed next to or over the respective data message 600 as shown in FIG. 6. The user may then select the display column to which the user wants to add the data messages from the selected "friend".

Referring now back to FIG. 2, in block 208, the computing device 102 receives and/or retrieves stream data from one or more of the social networking services server 104, the blogging service server 106, the mobile messaging service server 108, the other messaging service server 110, and/or the remote computer(s) 112. As discussed above, the stream data is embodied as a plurality of data messages. In some embodiments, the data messages may be embodied as text messages having a predetermined maximum character length (e.g., a maximum of 256 characters, a maximum of 160 characters, or other predetermined maximum). The predetermined maximum character length may be determined by the communication service providers, by the communication technology protocol used, or by some other parameter. Further, in some embodiments, the data messages may include or otherwise be embodied as a picture(s), an image(s), a sound(s), or other non-text data in addition to or in place of text data.

In block 210, the computing device 102 analyzes each of the data messages 600 received from the servers 104, 106, 108, 110, and/or the remote computer(s) 112. For example, in one embodiment, the computing device 102 may determine identification data of each data message 600 in block 212. The identification data may be embodied as, form a portion of, or otherwise be based on meta-data associated with each data message 600. For example, the identification data may be embodied as data indicative of the source of the data message 600, such as the author, the social group to which the message belongs, the communication service provider (e.g., Twitter®, Facebook®, etc.), the software package used to generate the data message 600, and/or other data indicative of the source of the data message 600. In one particular embodiment, the identification data is embodied as a uniform resource locator (URL) of the communication service provider from which the data message 600 originated. As discussed above, the identification data may determined by analysis of the meta-data of each particular data message 600.

In block 214, the computing device 102 assigns one or more display columns 400 in which each data message 600 is to be displayed based on the identification data. For example, if the user had created a display column 400 for displaying all messages received from an "NBA" friend group, all data messages received from the "NBA" friend group will be assigned to at least the "NBA" display column. Alternatively, if the user had created a display column from displaying all messages received from "John Doe", all data messages received from "John Doe" will be assigned to at least the "John Doe" display column.

Figure 7:
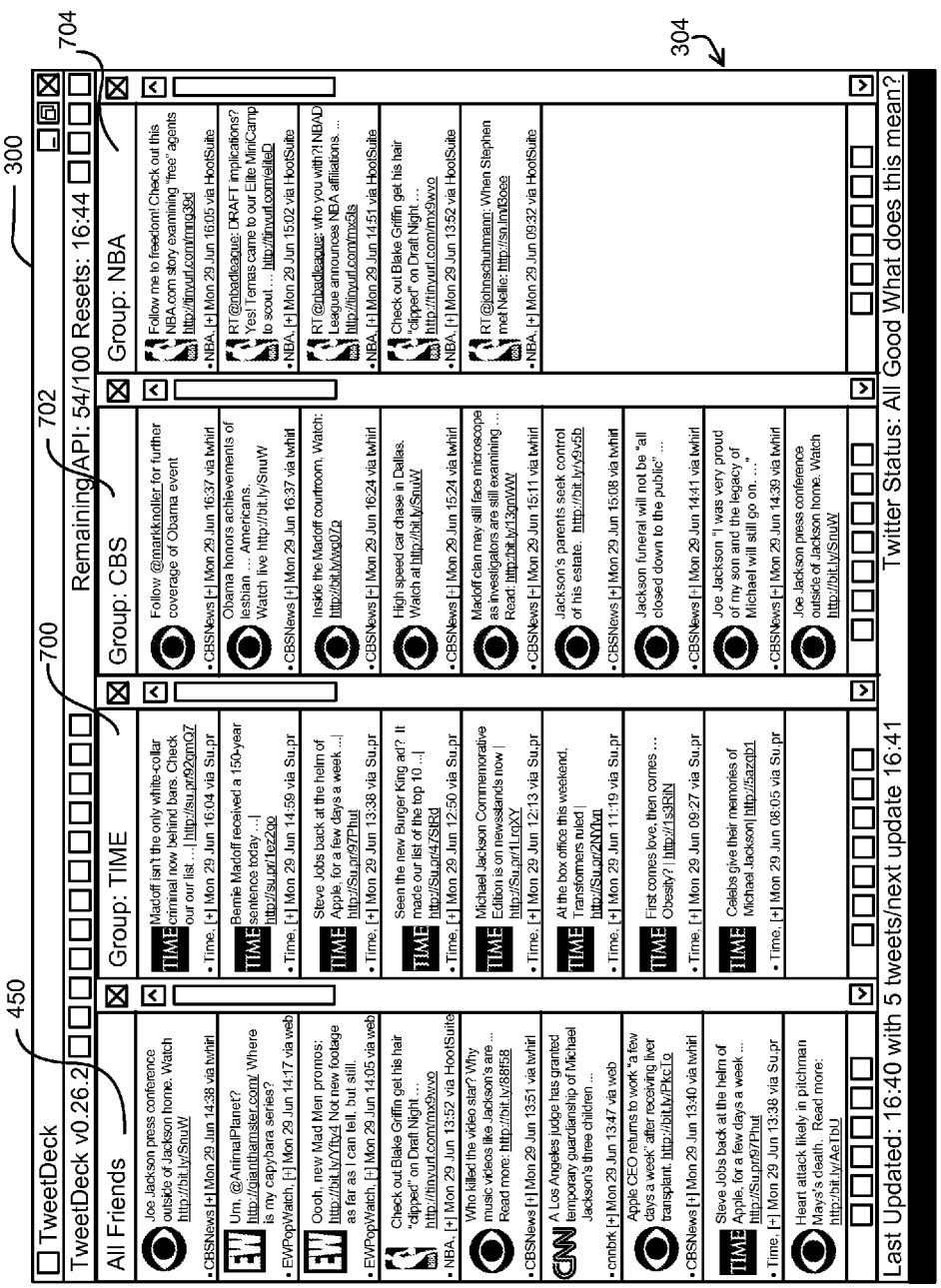

Subsequently, in block 216, the computing device 102 displays each of the received data messages 600 in each of the respectively assigned display columns 400. For example, as illustrated in FIG. 7, the user may create a "TIME" display column 700 for displaying all data messages received from the TIME social group or "friend" group, a "CBS" display column 702 for displaying all data messages received from the "CBS" social group, and an "NBA" display column 704 for displaying all data messages received from the "NBA" social group. As shown in FIG. 7, each data message 600 that has been received from the TIME social group is displayed in the "TIME" display column 700, each data message 600 that has been received from the CBS social group is displayed in the "CBS" display column 702, and each data message 600 that has been received from the NBA social group is displayed in the "NBA" display column 704. It should be appreciated that each of the data messages 600 displayed in the columns 700, 702, 704 may also be displayed in the "All Friends" display column 450. After the computing device 102 has displayed the recently received data messages 600 in the assigned display columns 400 in block 216, the process 200 loops back to block 208 in which additional data messages are received and/or retrieved from the servers 104, 106, 108, 110, and/or remote computer(s) 112.

Figure 8:
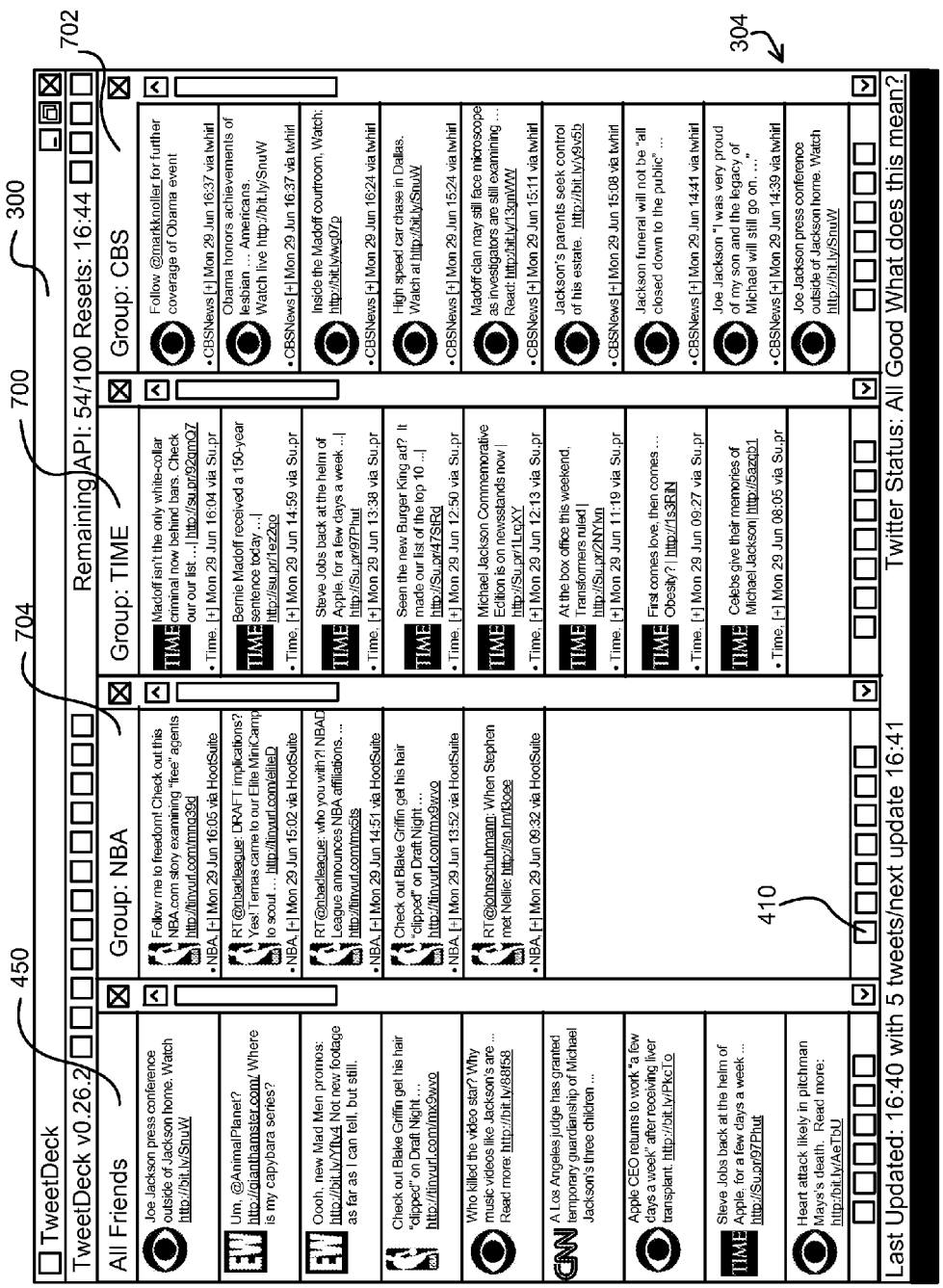

As discussed in detail above, the user may perform a number of management and/or configuration procedures on the graphical user interface 300. For example, in the illustrative embodiment of FIG. 7, the "NBA" display column 704 is displayed on the right-most side of the data message display area 304 of the graphical user interface 300. However, the user may change the location of the "NBA" display column 704 by selecting one of the move-column buttons 410, 420 located on the tool bar 404 associated with the column 704. For example, if the user may reposition the "NBA" display column 704 toward the left of the data message display area 304 via selection of the left move-column button 410. In response, the "NBA" display column 704 is displayed toward the left of the "TIME" display column 700 and the "CBS" display column 702 as shown in FIG. 8.

Figure 9:
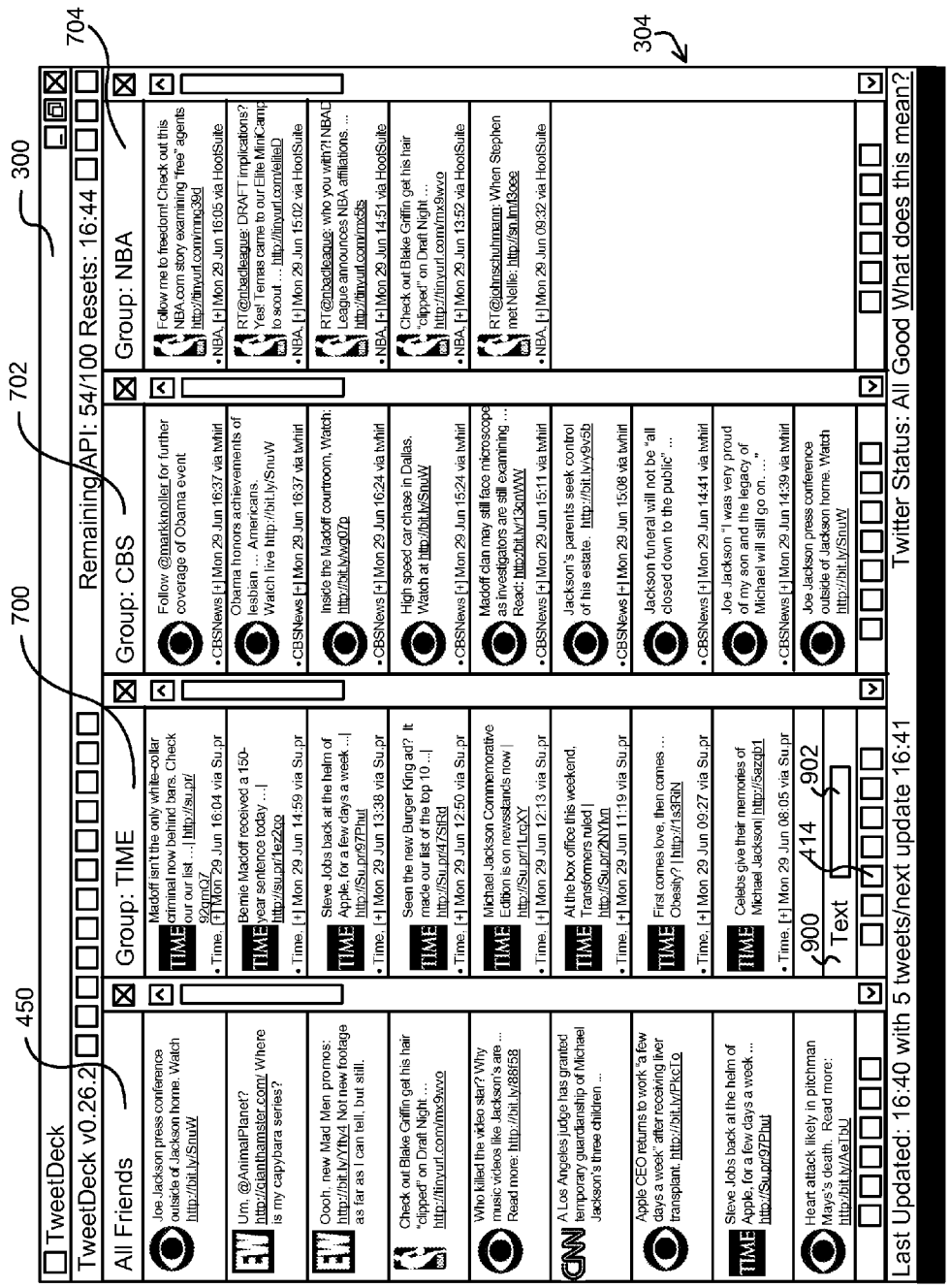

Additionally, the user may filter the data messages 600 displayed in any of the display columns 400 via selection of the filter-column button 414 located on the tool bar 404 associated with the display column 400. For example, as shown in FIG. 9, the user may select the filter-column button 414 to cause a filter window 900 to be displayed. The filter window 900 includes a filter data window 902 in which the user may enter filter data. In response, the data messages 600 currently displayed in the respective display column 400 are filter based the filter data provided by the user. For example, only those data messages including the filter data will be displayed in the display column 400.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the systems, devices, and methods described herein. It will be noted that alternative embodiments of the systems, devices, and methods of the present disclosure may not include all of the features described yet still benefit from at least some of the advantages of such features. Those of ordinary skill in the art may readily devise their own implementations of the systems, devices, and methods that incorporate one or more of the features of the present invention and fall within the spirit and scope of the present disclosure as defined by the appended claims.

The invention claimed is:

1. A method for displaying messages, comprising:
receiving, by a computing device, a plurality of broadcast messages;

displaying, on a display screen, an indication of each of the plurality of broadcast messages in a first column of a plurality of columns;

identifying, by the computing device, a subset of the plurality of broadcast messages each associated with an explicit mention of a user;

assigning, based on the explicit mention of the user and by the computing device, each of the subset of the plurality of broadcast messages to a second column of the plurality of columns; and displaying, on the display screen, an indication of each of the subset of the plurality of broadcast messages in the second column.

2. The method of claim 1, further comprising:

identifying a plurality of short text messages among the plurality of broadcast messages; and identifying, in meta-data associated with the plurality of short text messages, a predefined maximum number of characters of the plurality of short text messages, wherein displaying the indication of each of the plurality of broadcast messages is based on the maximum number of characters.

3. The method of claim 1, further comprising:

obtaining meta-data associated with each of the plurality of broadcast messages; and assigning, based at least on the meta-data, a second subset of the plurality of broadcast messages to a third column of the plurality of columns.

4. The method of claim 3, wherein the meta-data identifies an author of each of the plurality of broadcast messages, and wherein the method further comprises:

displaying, in the graphical user interface, a name of the author of each of the plurality of broadcast messages in its assigned column.

5. The method of claim 1, further comprising:

receiving, from a user, a selection of filter data associated with a column of the plurality of columns; and filtering, based on the selection, a subset of the plurality of broadcast messages displayed in the column.

6. The method of claim 1, further comprising:

identifying a timestamp of each of the plurality of broadcast messages, wherein the indications of the plurality of broadcast messages are displayed vertically in chronological order of the timestamps.

7. A system for processing messages, comprising:

a computer processor; and an application executing on the computer processor and configured to:

receive a plurality of broadcast messages;

assign the plurality of broadcast messages to a first column of a plurality of columns, wherein an indication of each of the plurality of broadcast messages is displayed in the first column;

identify a subset of the plurality of broadcast messages each associated with an explicit mention of a user;

assign, based on the explicit mention of the user, each of the subset of the plurality of broadcast messages to a second column of the plurality of columns; and transmit each of the subset of the plurality of broadcast messages for display, wherein an indication of each of the subset of the plurality of broadcast messages is displayed in the second column.

8. The system of claim 7, the application further configured to:

identify a plurality of short text messages among the plurality of broadcast messages; and identify, in meta-data associated with the plurality of short text messages, a predefined maximum number of characters of the plurality of short text messages, wherein the indication of each of the plurality of broadcast messages is displayed based on the maximum number of characters.

9. The system of claim 7, the application further configured to:

obtain meta-data associated with each of the plurality of broadcast messages; and assign, based at least on the meta-data, a second subset of the plurality of broadcast messages to a third column of the plurality of columns.

10. The system of claim 9, wherein the meta-data identifies an author of each of the plurality of broadcast messages, and wherein the application is further configured to:

transmit a name of the author of each of the plurality of broadcast messages for display with its assigned column.

11. The system of claim 7, the application further configured to:

receive a selection of filter data associated with a column of the plurality of columns; and filter, based on the selection, a different subset of the plurality of broadcast messages displayed in the column.

12. The system of claim 7, the application further configured to:

identify a timestamp of each of the plurality of broadcast messages, wherein the indications of the plurality of broadcast messages are displayed vertically in chronological order of the timestamps.

13. The system of claim 7, wherein the plurality of broadcast messages are transmitted to a client computing device, and wherein the client computing device displays the plurality of columns in a graphical user interface.

14. A non-transitory computer readable storage medium comprising a plurality of instructions for processing messages, the plurality of instructions comprising functionality to:

receive a plurality of broadcast messages;

display an indication of each of the plurality of broadcast messages in a first column of a plurality of columns;

identify a subset of the plurality of broadcast messages each associated with an explicit mention of a user;

assign, based on the explicit mention of the user, each of the subset of the plurality of broadcast messages to a second column of the plurality of columns; and display an indication of each of the subset of the plurality of broadcast messages in the second column.

15. The non-transitory computer readable storage medium of claim 14, the plurality of instructions further comprising functionality to:

identify a plurality of short text messages among the plurality of broadcast messages; and identify, in meta-data associated with the plurality of short text messages, a predefined maximum number of characters of the plurality of short text messages, wherein displaying the indication of each of the plurality of broadcast messages is based on the maximum number of characters.

16. The method of claim 1, wherein each broadcast message of the subset comprises the explicit mention within message text of the broadcast message.

17. The method of claim 16, wherein identifying the subset of the plurality of broadcast messages comprises:

searching message text of the plurality of broadcast messages to identify the explicit mention.

18. The method of claim 1, wherein the first column and the second column are displayed simultaneously in a graphical user interface on the display screen.

19. The method of claim 1, further comprising:
identifying, in the meta-data, a source of each of the plurality of broadcast messages, wherein assigning the second subset of the plurality of broadcast messages to the third column of the plurality of columns is based on the source.

20. The method of claim 19, wherein the source is a communication service provider, and wherein the meta-data comprises a uniform resource locator (URL) of the communication service provider.

\* \* \* \* \*

UNITED STATES PATENT AND TRADEMARK OFFICE
CERTIFICATE OF CORRECTION

| | | |
|---|---|---|
| PATENT NO. | : 8,656,289 B1 | Page 1 of 1 |
| APPLICATION NO. | : 13/525758 | |
| DATED | : February 18, 2014 | |
| INVENTOR(S) | : Iain Gregory Dodsworth | |

It is certified that error appears in the above-identified patent and that said Letters Patent is hereby corrected as shown below:

In the Claims:

At column 11, claim number 4, line number 33, "in the graphical user interface" should read --in a graphical user interface--.

At column 11, claim number 5, line number 37, "from a user" should read --from the user--.

At column 13, claim number 19, line number 4, "The method of claim 1" should read --The method of claim 3--.

Signed and Sealed this
Twenty-second Day of September, 2015

Michelle K. Lee
*Director of the United States Patent and Trademark Office*